June 3, 1952 J. F. EDER 2,598,771
FISHING LURE
Filed Nov. 10, 1950
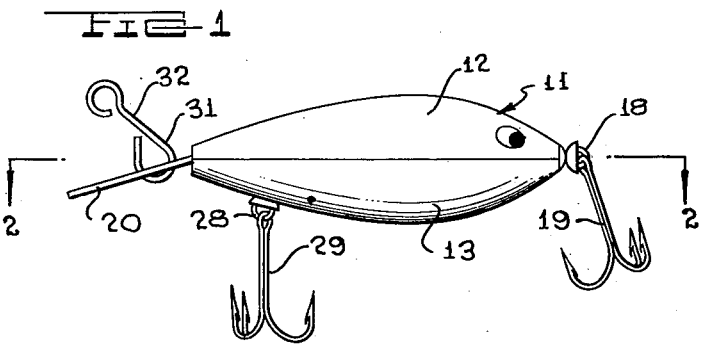
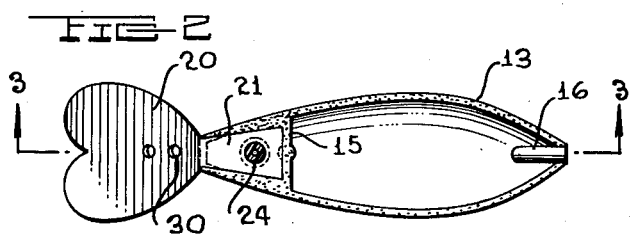
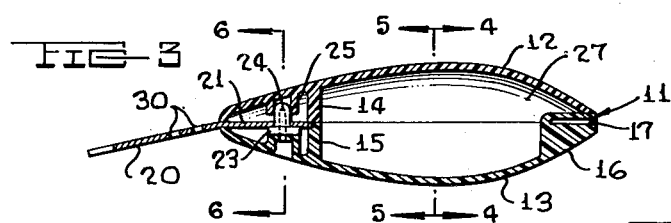
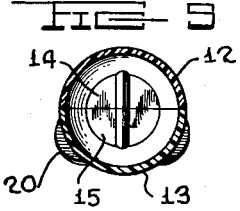 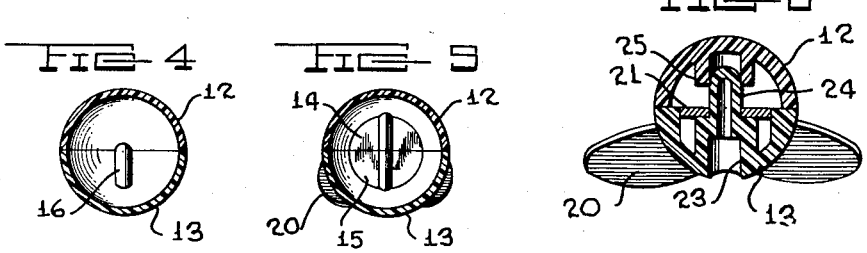 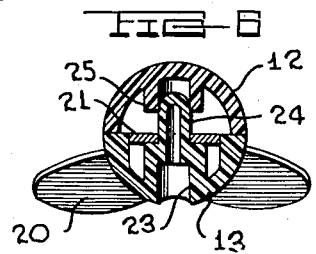
*INVENTOR.*
JOHN F. EDER
BY
McMorrow, Berman + Davidson
ATTORNEYS Patented June 3, 1952

2,598,771

UNITED STATES PATENT OFFICE 2,598,771

FISHING LURE

John F. Eder, Sherman, Tex.

Application November 10, 1950, Serial No. 195,100

4 Claims. (Cl. 43—42.35)

1

This invention relates to fishing lures, and more particularly to a fishing lure of the "back-running" type adapted to simulate the movements of the most helpless forms or species of large bait or marine life, such as shrimp, crawfish, and the like, when drawn through the water.

A main object of the invention is to provide an improved "back-running" lure of the floating type, which, however, is deep running, resulting in an action simulating the movements of live bait when drawn through the water, the lure being very simple in construction, attractive in appearance and very durable.

A further object of the invention is to provide an improved "back-running" fishing lure so designed as to move in an erratic and violent manner when drawn through the water simulating the movements of the most helpless forms or species of live bait, said lure being inexpensive to manufacture, being adaptable to simulate the different types of live bait, the movements of which are simulated by the "back-running" principle of operation of the lure, particularly the appearance of the most helpless form or species of live bait or marine form, such as shrimp, crawfish and the like, the lure being so constructed that the running depth is readily adjustable to vary the depth of travel of the lure as it is moved through the water without affecting the buoyancy of the lure, the lure being completely buoyant no matter how often the lure is adjusted to provide different running positions.

Further objects and advantages of the invention will become apparent from the following description and claims, and from the accompanying drawings, wherein:

Figure 1 is a side elevational view of an improved fishing lure constructed in accordance with the present invention;

Figure 2 is a longitudinal sectional view taken on line 2—2 of Figure 1;

Figure 3 is a vertical longitudinal sectional view taken on line 3—3 of Figure 2;

Figure 4 is a cross-sectional view taken on line 4—4 of Figure 3;

Figure 5 is a cross-sectional view taken on line 5—5 of Figure 3;

Figure 6 is an enlarged cross-sectional view taken on line 6—6 of Figure 3.

Referring to the drawings, the lure is designated generally at 11, and comprises an upper, concave segment 12 which mates with and which is secured to a lower, concave segment 13, said segments being elongated and generally simulating in contours the upper and lower portions of a live bait. As shown in Figure 3, the upper seg-

2 ment 12 is formed adjacent its rear end with a depending, transverse wall 14, and the lower segment 13 is formed adjacent its rear end portion with a transverse wall element 15 which mates with the element 14 to define a transverse partition in the body of the lure when the segments 12 and 13 are placed together in mating position, as shown in Figure 3. The lower segment 13 is formed at its forward end with a longitudinally extending rib 16 which is formed with a longitudinally extending bore 17, defining a socket for an eye bolt 18 which is adapted to be secured therein. The eye bolt 18 has attached thereto the front fishing hook unit 19, as shown in Figure 1. Designated at 20 is a generally heart-shaped tail member provided with a forwardly extending shank portion 21 which is received between the rear end portions of the segments 12 and 13. The member 20 and its shank portion 21 are formed from a single piece of flat sheet metal, such as stainless steel or the like, and the forward edge of the anchoring member 21 is received between the transverse wall elements 14 and 15, as shown in Figure 3. The rear portion of the lower segment 13 is formed adjacent its rear end with an upwardly projecting socket element 23 which has a reduced top portion 24, as shown in Figure 3. The upper segment 12 is formed with a substantially annular seat 25 which receives the reduced top portion 24 of the socket element 23. The reduced portion 24 extends through an opening in the anchoring member 21 and positively prevents the tail member 20 from being detached from the lure. The reduced portion 24 makes a tight fit in the annular seat 25. The abutting edges of the segments 12 and 13 are securely fastened together, as by the use of suitable adhesive material. It will be noted that a large hollow sealed space, designated at 27, is defined in the forward portion of the lure body, said space being sealed with respect to the rear space in which the anchor portion 21 of the tail member is located. The tail member 20 is bendable to vary the character of the movements of the lure as it is drawn through the water, and the adjustment of the tail does not affect the buoyancy of the lure in view of the sealing of the forward space of the lure provided by the transverse wall sections 14 and 15.

The socket member 23 is adapted to receive an eye bolt 28 to which is connected a fishhook unit 29, as shown in Figure 1. The heart-shaped tail member 20 is formed with a pair of apertures 30, 30 which receive the hook portion 31 of a connector member 32, whereby the lure may be fastened to a fishing line.

The exerior surfaces of the segments 12 and 13 may be suitably decorated to simulate different types of live bait and to enhance the attraction of the lure to fish. The segments 12 and 13 are preferably formed of plastic material or the like, and the tail member is formed of suitable corrosion-resistant metal, such as stainless steel. The use of metal for the tail member allows said tail member to bend to any desired position of adjustment.

The two-compartment, hollow, plastic body and heart-shaped metal wiggle plate design is responsible for the "back-running" principle obtained in the fishing lure of the present invention. It will be noted that the largest section, or air compartment, of the buoyant body extends from the head portion of the bait, with the smallest air compartment or section comprising the sealed chamber containing the anchoring element of the metal wiggle plate, thus enabling the bait, when stationary, to float at approximately a 45-degree angle under water. This construction further enables the bait, when striking an underwater obstruction, to back off from the obstruction, freeing itself from entanglement, and popping up to the surface, the metal wiggle plate adjusted to a proper angle acting as a fin or rudder. Said metal wiggle plate cooperates with the buoyancy of the bait to withdraw the lure from the obstruction or entanglement as it floats to the surface.

The provision of the two lobes on the heart-shaped metal tail produces a very erratic action of the lure as it is drawn through the water. It will be noted that the heart-shaped lure 20 tapers toward its connection with the lure body and the body of the lure has its minimum diameter at the connection of the tail 20 therewith. Therefore, when the lure is moved through the water, the erratic action thereof is produced by the co-action of the water with the tail member 20, but drag is minimized, since water moving past the tail member escapes from the tail member at the smallest diameter of the body of the lure.

The above-described construction represents a radical departure from the construction of conventional types of lures and provides an action which is very effective in attracting fish.

While a specific embodiment of an improved fishing lure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing lure comprising a pair of elongated concave segments arranged in face to face abutting relation and secured together to form a closed hollow buoyant body, a first wall arranged transversely of and within one of said segments adjacent to and spaced from one end thereof and from the transverse center line of said segment and secured to said one segment, a second wall arranged transversely of and within the other of said segments adjacent to and spaced from one end thereof and from the transverse center line of said other segment and secured to said other segment, said second wall abutting and forming with said first wall a partition to thereby subdivide the hollow body into a pair of compartments, a tail member embodying a flat shank portion and a flat heart-shaped portion arranged at an angle with respect to said shank portion and connected by a narrow section to the latter, said flat heart shaped portion being positioned exteriorly of and contiguous to the end of said hollow body adjacent said partition, the shank portion of said tail member extending between and being engaged by the abutting end portions of said segment and the abutting walls of said segments, said narrow section of said tail member being contiguous to the abutting end portion of said segments, and a fixed socket element arranged transversely of and within and carried by one of said segments intermediate said partition and said end of said hollow body adjacent said partition extending through said shank portion of said tail member.

2. A fishing lure comprising a pair of elongated concave segments arranged in face to face abutting relation and secured together to form a closed hollow buoyant body, a first wall arranged transversely of and within one of said segments adjacent to and spaced from one end thereof and from the transverse center line of said segment and secured to said one segment, a second wall arranged transversely of and within the other of said segments adjacent to and spaced from one end thereof and from the transverse center line of said other segment and secured to said other segment, said second wall abutting and forming with said first wall a partition to thereby subdivide the hollow body into a pair of compartments, a tail member embodying a flat shank portion and a flat heart shaped portion arranged at an angle with respect to said shank portion and connected by a narrow section to the latter, said flat heart shaped portion being positioned exteriorly of and contiguous to the end of said hollow body adjacent said partition, the shank portion of said tail member extending between and being engaged by the abutting end portions of said segments and the abutting walls of said segments, said narrow section of said tail member being contiguous to the abutting end portions of said segments, a fixed socket element arranged transversely of and within and carried by one of said segments intermediate said partition and said end of said hollow body adjacent said partition extending through said shank portion of said tail member and a seat arranged transversely of and carried by the other of said segments and embracingly receiving the adjacent end portion of said socket element.

3. A fishing lure comprising a pair of elongated concave segments arranged in face to face abutting relation and secured together to form a closed hollow buoyant body, a first wall arranged transversely of and within one of said segments adjacent to and spaced from one end thereof and from the transverse center line of said segment and secured to said one segment, a second wall arranged transversely of and within the other of said segments adjacent to and spaced from one end thereof and from the transverse center line of said other segment and secured to said other segment, said second wall abutting and forming with said first wall a partition to thereby subdivide the hollow body into a pair of compartments, the tail member embodying a flat shank portion and a flat heart shaped portion arranged at an angle with respect to said shank portion and connected by a narrow section to the latter, said flat heart shaped portion positioned exteriorly of and contiguous to the end of said hollow body adjacent said partition, the shank portion of said tail member extending between and being engaged by the abutting end portions of said segments and the abutting wall of said segments, said narrow section of said tail member being contiguous to the abutting end portions of said segments, a fixed socket element arranged transversely of and within and carried by one of said segments intermediate said partition and said end of said hollow body adjacent said partition extending through said shank portion of said tail member, a seat arranged transversely of and carried by the other of said segments and embracingly receiving the adjacent end portion of said socket element, there being a socket extending longitudinally inwardly from the other end of one of said segments, and a fishhook unit arranged exteriorly of said body and secured to said socket.

4. A fishing lure comprising a pair of elongated concave segments arranged in face to face abutting relation and secured together to form a closed hollow buoyant body, a first wall arranged transversely of and within one of said segments adjacent to and spaced from one end thereof and from the transverse center line of said segment and secured to said one segment, a second wall arranged transversely of and within the other of said segments adjacent to and spaced from one end thereof and from the transverse center line of said other segment and secured to said other segment, said second wall abutting and forming with said first wall a partition to thereby subdivide the hollow body into a pair of compartments, a tail member embodying a flat shank portion and a flat heart shaped portion arranged at an angle with respect to said shank portion and connected by a narrow section to the latter, said flat heart shaped portion being positioned exteriorly of and contiguous to the end of said hollow body adjacent said partition, the shank portion of said tail member extending between and being engaged by the abutting end portions of said segments and the abutting walls of said segments, said narrow section of said tail member being contiguous to the abutting end portions of said segments, a fixed socket element arranged trasversely of and within and carried by one of said segments intermediate said partition and said one end of said hollow body adjacent said partition extending through said shank portion of said tail member, a seat arranged transversely of and carried by the other of said segments and embracingly receiving the adjacent end portion of said socket element, there being a socket extending longitudinally inwardly from the other end of one of said segments, a fishhook unit arranged exteriorly of said body and secured to said socket, and a second fishhook unit positioned exteriorly of said body and dependingly secured to said socket element, said heart shaped portion of said tail member being provided with means for attachment of a connector member thereto.

JOHN F. EDER.

REFERENCES CITED

The following references are of record in the file of this patent:

UNITED STATES PATENTS

| Number | Name | Date |
| --- | --- | --- |
| 538,169 | Kelly | Apr. 23, 1895 |
| 903,333 | Slocum et al. | Nov. 10, 1908 |
| 1,321,850 | Rhodes | Nov. 18, 1919 |
| 2,307,200 | Cullerton | Jan. 5, 1943 |
| 2,425,272 | Walker et al. | Aug. 5, 1947 |